April 3, 1956  R. L. MOUNSDON ET AL  2,740,543
BOAT TRAILER

Filed June 20, 1951  2 Sheets-Sheet 1

Russel L. Mounsdon
Harold G. Hill
INVENTORS.

BY *Clarence A. O'Brien*
*and Harvey B. Jacobson*
Attorneys

April 3, 1956   R. L. MOUNSDON ET AL   2,740,543
BOAT TRAILER
Filed June 20, 1951   2 Sheets-Sheet 2
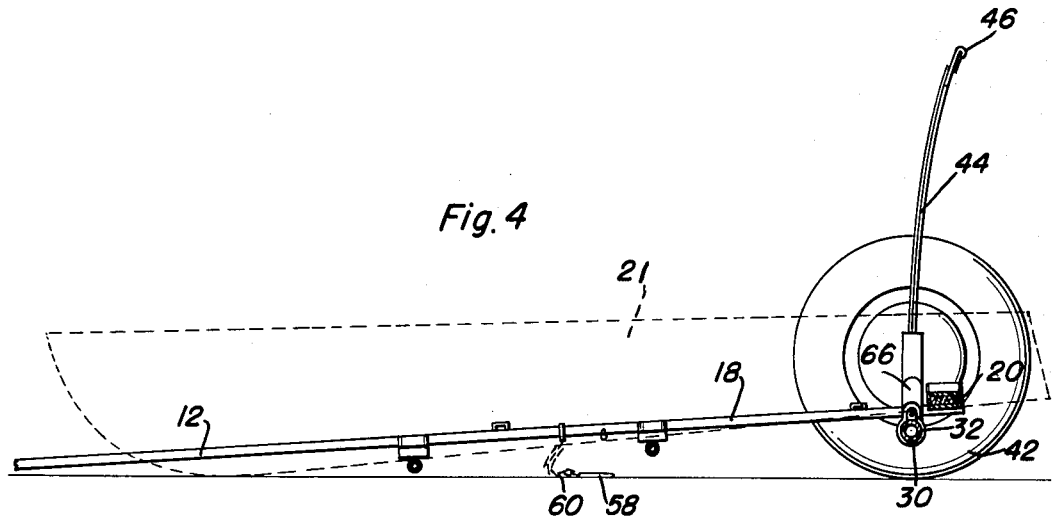
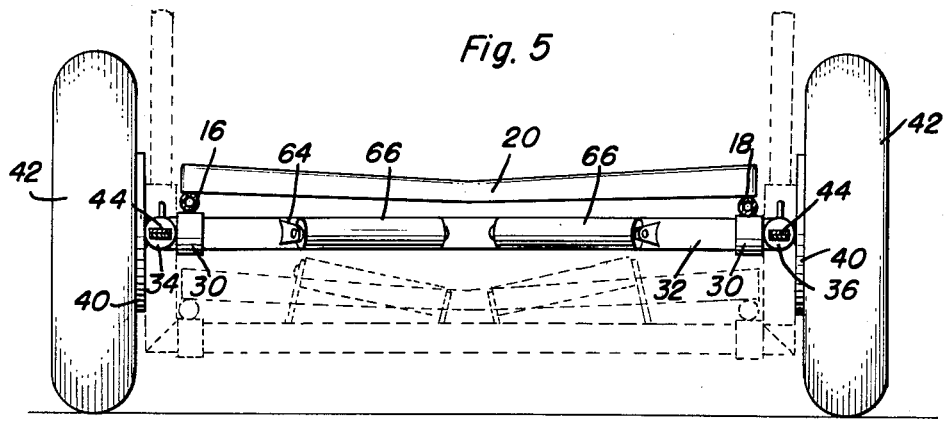
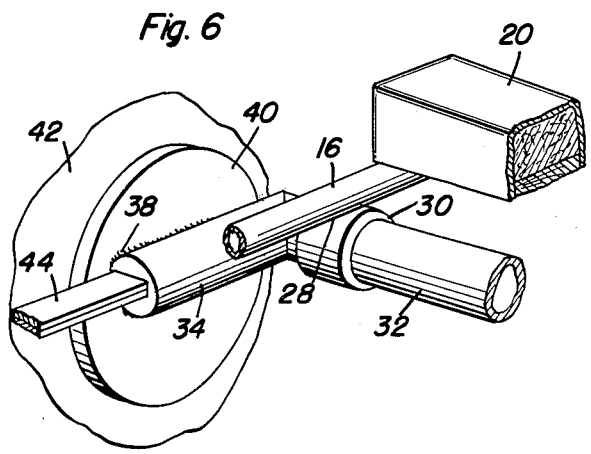
Russel L. Mounsdon
Harold G. Hill
INVENTORS.

2,740,543
BOAT TRAILER

Russel L. Mounsdon and Harold G. Hill, Alexandria, Minn.

Application June 20, 1951, Serial No. 232,538

6 Claims. (Cl. 214—506)

This invention relates to a trailer detachably mounted upon a towing vehicle and especially adapted for supporting a boat.

The primary object of this invention is to provide a boat trailer having a novel means for raising and lowering the boat supporting frame relative to the wheels of the trailer so that the boat can be pushed on the frame and then raised for transportation with a minimum of force required for lifting the boat.

A further object of this invention is to provide a boat trailer of the character described which is relatively simple in design and construction, very easy to operate to effect the raising and lowering mechanisms of the frame and very efficient for its intended purpose.

These, together with various ancillary objects and features of the invention which will later become apparent as the following description proceeds, are attained by the device, a preferred embodiment of which has been illustrated by way of example only in the accompanying drawings:

Figure 4 is a sectional view taken substantially on the plane of section line 4—4 of Figure 1;

Figure 5 is a sectional view taken substantially on the plane of section line 5—5 of Figure 1; and Figure 6 is a fragmentary enlarged perspective view illustrating a detail of the raising and lowering mechanism.

Specific reference is now made to the drawings. In the several views in the accompanying drawings and in the following specification similar reference characters indicate corresponding elements throughout.

Figure 1:
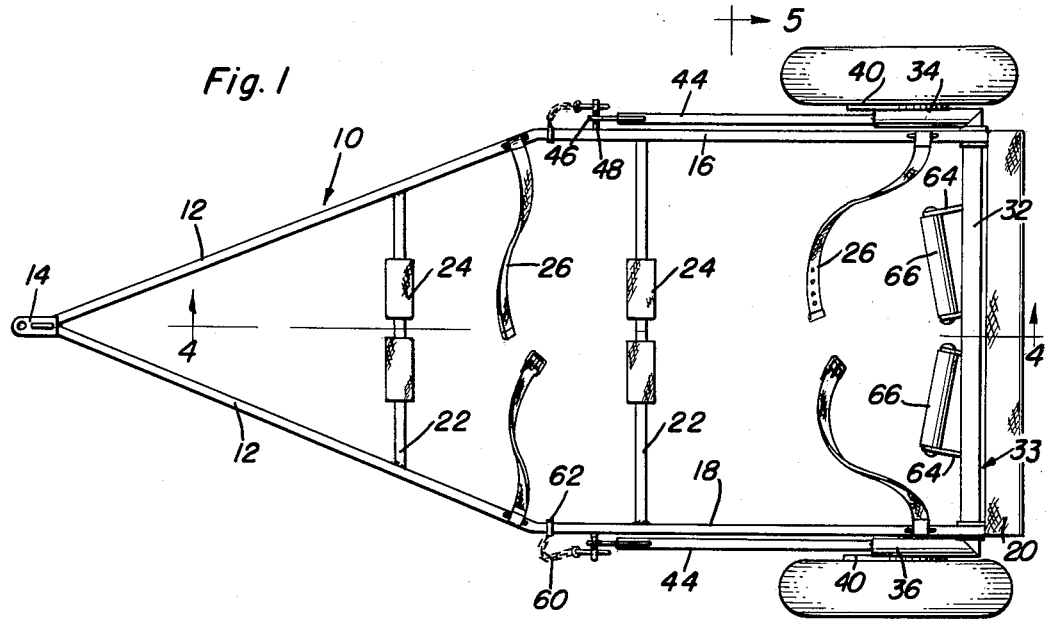
Figure 1 is a top plan view of the trailer.
Figure 2:
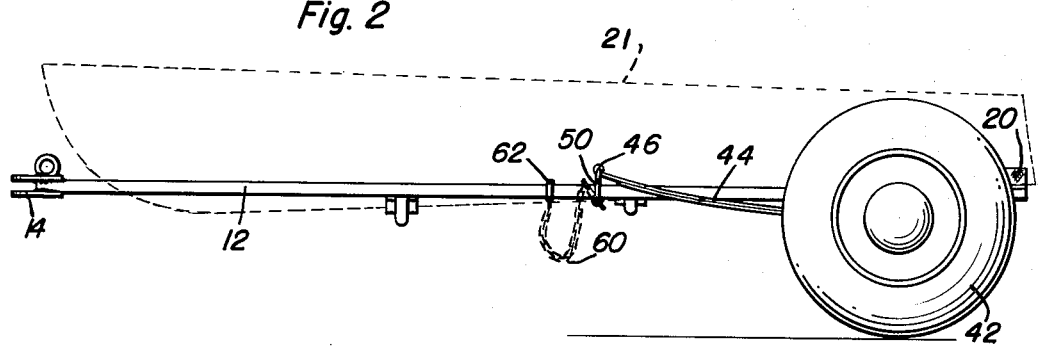
Figure 2 is a side elevational view of the trailer.
Figure 3:
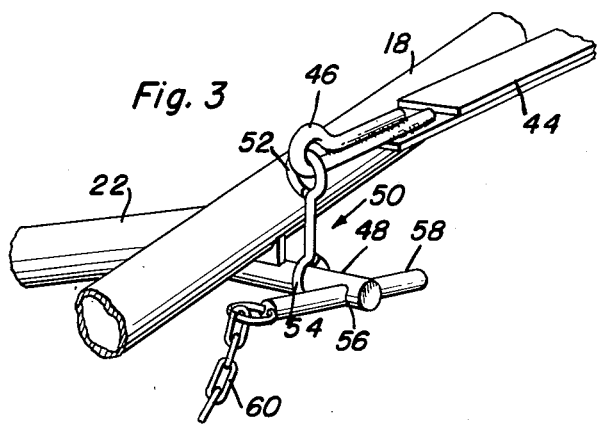
Figure 3 is a fragmentary enlarged perspective view of the means for releasably retaining one of the springs on the frame.

The present trailer includes a frame generally indicated at 10 having converging rods 12 terminating in a suitable hitch 14 for removably securing the same to a towing vehicle. The divergent ends of the rods 12 are integral with a pair of transversely spaced parallel side members or rods 16 and 18 to the rear ends of which is secured a transverse ledge 20 of suitable shape and dimensions to support one end portion of a boat 21. Rods 12 and the side members 16 and 18 are further interconnected by transversely extending brace rods 22 upon which are secured padded rolls 24 serving also to support the boat 21, the brace rods 22 and the ledge 20 being preferably somewhat V-shaped to accommodate the undersurface of the boat. Suitable straps 26 are carried by the rods 12 and side members 16 and 18 for detachably retaining the boat on the frame 10.

The rear portions of the side members 16 and 18 are welded as at 28 to transversely extending collars 30 which serve to journal the transversely extending web portions 32 of a substantially U-shaped member generally indicated at 33.

Each of the leg portions 34 and 36 is welded as at 38 to a circular plate or disk 40 that is in turn secured upon, in offset relation to, stub axles (not shown) journaling the two wheels 42 at the rear end of the trailer.

Carried by each of the leg portions 34 of the U-shaped member is an elongated spring 44 preferably fabricated of a pair of flat resilient bars, the free end of which has secured thereto an eye or hook member 46. A laterally extending rod 48 is secured at one end to each of the side members 16 and 18 adjacent its juncture with the converging rods 12 and a link 50 is provided which has an upper eye 52 engaging the hook 46 and a lower eye 54 slidably engaging the rod 48. The rod 48 includes an aperture 56 adjacent its free end for removably receiving a pin 58 carried at the end of a flexible member or chain 60 which is anchored as at 62 to each of the side members 16 and 18.

Secured by appropriate brackets 64 to the web portions 32 intermediate its ends is a pair of rollers 66 which normally extend in a horizontal position relative to the frame 10 when the ends of the springs 44 are secured to the side members 16 and 18 as shown in the drawings. In use, the hitch 14 is detached from the towing vehicle and is allowed to rest on the ground. After the straps 26 are loosened, the pins 58 are removed from the rod 48 carried by the side members 16 and 18 and the boat resting upon the rear ledge 20 together with the resiliency of the springs 44 will cause the springs to move into a vertical position as shown in Figure 4, the U-shaped member 34 rotating with the springs about the stub axle rotatably mounting the wheels 42. When such rotation occurs, the rollers 66 are lowered relative to the rear portion of the frame 10 and assume a position beneath the transverse axis of the wheels as shown in dotted lines in Figure 5. This lowers the boat so that it can be easily slid off the frame 10 with a minimum of effort. To load the trailer, the boat is slid onto the frame 10 while the rollers 66 are maintained in the lowest position as shown in dotted lines in Figure 5. The boat is then strapped onto the trailer and leverage is applied to the elongated springs 44 until their free ends can be secured to the side members 16 and 18 by means of the removable pins 58. Inasmuch as the springs 44 are quite long, almost equal in length to the side members 16 and 18, it will be seen that a relatively small force will be required to elevate the boat and rear portions of the frame 10 for the transport position. In this position, the rollers 66 engage the bottom of the boat being held in a substantially vertical position as compared to the horizontal lowered position. The hitch 14 may then be secured to a suitable towing vehicle and the boat transported to its desired location. It will be understood that the slight amount of lifting required for the boat to be mounted upon the frame while the rollers 66 are in the lowered position can be effected either manually or by the buoyant force of a body of water.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A boat trailer comprising a frame and means for removably attaching the forward end thereof to a towing vehicle, a U-shaped member including a web portion and legs, means journaling said web portion on the rear end of said frame, wheels, stub axles journaling said wheels, means securing said legs in offset relation to said axles, rollers carried by said web portion, elongated springs each secured at one of its ends to one of said legs, and means for releasably retaining the free ends of said springs on said frame whereby when the free ends of said springs are released, they will swing upwardly moving said rollers from a lowered to a raised position substantially level with said frame, said means securing said legs in offset relation comprising disks secured to said stub axles, said legs being secured to said disks.

2. A boat trailer comprising a frame, a U-shaped member including a web portion and legs, means journaling said web portion on the rear end of said frame, supporting wheels for said frame journaled on said legs adjacent the free ends thereof, elongated springs each secured at one of its ends to one of said legs, and means for releasably retaining the free ends of said springs on said frame whereby when the free ends of said springs are released they will spring upwardly lowering the frame with respect to the wheels, said springs extending longitudinally from said legs, said releasable retaining means including a lateral rod carried at each side of said frame and including an aperture adjacent its free end, a hook at the free end of each spring, a link engaging said hook and slidable on said rod, a flexible member secured to said frame and pin carried thereby and removably receivable in said aperture provided in said rod.

3. A boat trailer comprising a frame and means for removably attaching the forward end thereof to a towing vehicle, a U-shaped member including a web portion and legs, means journaling said web portion on the rear end of said frame, wheels, stub axles journaling said wheels, means securing said legs in offset relation to said axles, rollers carried by said web portion, elongated springs each secured at one of its ends to one of said legs, and means for releasably retaining the free ends of said springs on said frame whereby when the free ends of said springs are released, they will swing upwardly moving said rollers from a lowered to a raised position substantially level with said frame, said releasable spring retaining means including a lateral rod carried at each side of said frame and including an aperture adjacent its free end, a hook at the free end of each spring, a link engaging said hook and slidable on said rod, a flexible member secured to said frame and a pin carried thereby and removably receivable in said aperture provided in said rod.

4. In a boat trailer, a frame having front and rear ends, a U-shaped yoke including a web portion and legs rigidly secured to said web portion, the web portion of said yoke extending transversely across said frame intermediate the ends thereof, means on said frame rotatably journalling said web portion about a transverse horizontal axis thereon, the legs of said yoke being disposed on opposite sides of said frame and outwardly thereof and extending forwardly of said journalling means and disposed adjacent the sides of said frame, supporting wheels for said frame, means rotatably mounting said wheels adjacent the free ends of said legs and in offset relationship from the pivot axis of said journalling means, elongated leaf springs each rigidly secured at one end to the free end of a corresponding one of said legs and movable therewith, said springs extending longitudinally from said legs toward the front of said frame, cooperating fastening means on the free end of each of said springs and on said frame intermediate the ends thereof releasably maintaining said legs and said springs in a position disposed adjacent to said frame, said legs and springs serving as a lever and suspension means and when used as a lever permitting said frame to drop between said wheels upon release of the fastening means and serving as a lever for raising said frame.

5. In a boat trailer, a frame having front and rear ends, a U-shaped yoke including a web portion and legs rigidly secured to said web portion, the web portion of said yoke extending transversely across said frame adjacent end portions thereof, means on said frame rotatably journalling said web portion about a transverse horizontal axis thereon, the legs of said yoke being disposed on opposite sides of said frame and outwardly thereof and extending forwardly of said journalling means and disposed adjacent the sides of said frame, supporting wheels journalled on said legs adjacent the free end thereof, elongated leaf springs each rigidly secured at one end to the free end of a corresponding one of said legs and movable therewith, said springs extending longitudinally from said legs toward the front of said frame, cooperating fastening means on the free ends of each of said springs and on said frame releasably maintaining said legs and said springs in a position disposed adjacent to said frame, said legs and springs serving as a lever and suspension means and when used as a lever permitting said frame to drop between said wheels upon release of the fastening means and serving as a lever for raising said frame.

6. In a boat trailer as set forth in claim 5 including roller means on said web portion for engagement with a lower portion of a boat being carried on said trailer, said roller means being movable with said web portion upon movement of the legs and leaf springs about the horizontal axis of said yoke.

References Cited in the file of this patent

UNITED STATES PATENTS

| | | |
|---|---|---|
| 2,141,781 | Allen | Dec. 27, 1938 |
| 2,442,071 | Bunten | May 25, 1948 |
| 2,442,248 | Sampsell | May 25, 1948 |
| 2,452,267 | Schramm | Oct. 26, 1948 |
| 2,478,795 | Whalen et al. | Aug. 9, 1949 |
| 2,487,701 | Getz | Nov. 8, 1949 |
| 2,495,449 | Francis | Jan. 24, 1950 |
| 2,496,599 | Rivers | Feb. 7, 1950 |
| 2,503,535 | Yarbrough | Apr. 11, 1950 |
| 2,506,699 | Byrd | May 9, 1950 |
| 2,577,246 | Hill | Dec. 4, 1951 |
| 2,608,314 | Krider | Aug. 26, 1952 |
| 2,610,865 | Cantrell | Sept. 16, 1952 |

FOREIGN PATENTS

| | | |
|---|---|---|
| 871,010 | France | Jan. 3, 1942 |